(12) United States Patent
Vianna

(10) Patent No.: US 7,962,295 B2
(45) Date of Patent: Jun. 14, 2011

(54) LEAKAGE DETECTION AND FLUID LEVEL PROGNOSTICS FOR AIRCRAFT HYDRAULIC SYSTEMS

(75) Inventor: Wlamir Olivares Loesch Vianna, Sao Bernardo do Campo (BR)

(73) Assignee: Embraer Empresa Brasileira De Aeronautica S.A., Sao Jose Dos Campos SP (BR)

(*) Notice: Subject to any disclaimer, the term of this patent is extended or adjusted under 35 U.S.C. 154(b) by 0 days.

(21) Appl. No.: 12/182,754

(22) Filed: Jul. 30, 2008

(65) Prior Publication Data

US 2010/0030496 A1    Feb. 4, 2010

(51) Int. Cl.
*G01F 23/00* (2006.01)
*G01M 15/00* (2006.01)

(52) U.S. Cl. ............ 702/51; 702/50; 702/113; 702/114; 73/40; 73/592

(58) Field of Classification Search .............. 702/50–51, 702/55, 113, 114; 73/40, 592
See application file for complete search history.

(56) References Cited

U.S. PATENT DOCUMENTS

| | | | |
|---|---|---|---|
| 2,281,125 A | 4/1942 | Wiemer | |
| 4,549,429 A | 10/1985 | Kurt | |
| 5,703,569 A | 12/1997 | Oliver et al. | |
| 6,871,160 B2 | 3/2005 | Jaw | |
| 7,000,455 B2 | 2/2006 | Stritzelberger | |
| 7,065,433 B2 | 6/2006 | Basu et al. | |
| 7,149,612 B2 | 12/2006 | Stefani et al. | |
| 2007/0028674 A1 | 2/2007 | Beiderman et al. | |
| 2007/0113623 A1 | 5/2007 | Wolford et al. | |

FOREIGN PATENT DOCUMENTS

WO    WO 2008/003352 A1 *  1/2008

OTHER PUBLICATIONS

"Aircraft Technical, aircraft hydraulics," www.pilotfriend.com/training/flight_training/tech/hydr/hydraulics.htm, 3 pages (printed Jul. 14, 2008).
Hertins, Delphine, "Hydraulic System Simulation," VIVACE Forum 1, Warwick, US (Sep. 20-21, 2005).
Smith, Lindsay I., "A tutorial on Principal Components Analysis" (Feb. 26, 2002).
European Search Report issued in corresponding EP Application No. EP 09 00 761 (Jan. 12, 2011).

* cited by examiner

*Primary Examiner* — Sujoy K Kundu
(74) *Attorney, Agent, or Firm* — Nixon & Vanderhye PC

(57) ABSTRACT

A method for detecting and predicting total hydraulic fluid level for aircraft hydraulic systems includes determining an estimated value for a parameter indicative of total fluid level or mass. Each new value is combined with an historical indication (e.g., from previous flights) to provide a prediction for the future value of total quantity indication. With the same combination, one can provide an estimated value for total system leakage or level loss. An alert can be generated if hydraulic fluid level or mass is predicted to fall below a predetermined level.

14 Claims, 5 Drawing Sheets

LEAKAGE DETECTION AND FLUID LEVEL PROGNOSTICS FOR AIRCRAFT HYDRAULIC SYSTEMS

CROSS-REFERENCES TO RELATED APPLICATIONS

N/A

STATEMENT REGARDING FEDERALLY SPONSORED RESEARCH OR DEVELOPMENT

N/A

FIELD

The technology herein relates generally to systems that monitor the operation of hydraulic systems for aircraft or other applications, and more specifically to a system for detecting and estimating fluid leakage within a hydraulic system on board an aircraft.

BACKGROUND AND SUMMARY

Generally speaking, a hydraulic system uses a fluid under pressure to operate or actuate a control member. A common lawn sprinkler is a simple hydraulic system which uses pressurized fluid (water) to mechanically operate the sprinkler head to rotate or reciprocate. Another pervasive example of a hydraulic system is the braking system commonly found on cars and trucks. A common type of automotive hydraulic braking system has a reservoir ("master cylinder") filled with brake fluid. Stepping on the brake pedal pressurizes the fluid in the reservoir and forces the pressurized fluid through tubes ("brake lines") that lead from the reservoir to each of the vehicle's wheels. The pressurized fluid actuates braking mechanisms on each wheel (e.g., disk calipers for disk brakes and/or brake pad contact with wheel drums for drum type brakes) to slow or stop the vehicle. Such hydraulic systems have proven to be reliable, lightweight, relatively easy to maintain and capable of providing good control.

Because of these and other advantages, aircraft have also long used hydraulic systems for a number of control applications including for example landing gear, brakes, steering, drag braces, flight controls, and the like. Typically an aircraft hydraulic system includes a pressurized reservoir and a hydraulic circuit containing a desired amount of hydraulic fluid. While such systems are generally quite reliable, it is possible that they can and will lose fluid over time. Loss of fluid can result in system misoperation, components failure and unscheduled maintenance.

Loss of hydraulic fluid typically occurs over time and at a very slow rate. While periodic inspection of the hydraulic system is desirable, it would also be desirable to automatically detect and monitor the amount of hydraulic fluid contained within the hydraulic system, and to automatically detect, measure and indicate the loss of hydraulic fluid in order to monitor system health.

Sensors are often used to monitor hydraulic system operation. In a car or truck, a sensor can be used to monitor the pressure the system is applying to the brake lines. Aircraft typically have more complex sensor systems including for example a quantity gauge to measure the quantity of fluid in the low pressure reservoir chamber, a pressure transducer and a temperature transducer.

Some known aircraft based systems gather large amounts of data and/or use a number of sensors whose main purpose is to estimate leakage and/or implement "built in tests". One example system estimates leakage using high frequency sampling rate pressure sensors located at pump discharge duct. Another known system sets the hydraulic system in a desirable operational condition and compares pump rotation to a reference value based on previous pump operational tests without leakage. A further exemplary system installs hydraulic flow sensors at the supply conduit and return conduit to provide an indication of leakage at each "consumer" (e.g., actuator or other hydraulically operated device).

While much more has been done in the past, further improvements are desirable. One area for improvement is to provide a predictive system that can automatically warn concerning potential failures so corrective action can be taken before failures actually occur.

Exemplary illustrative non-limiting methods and systems herein provide analytical techniques for processing data obtained from onboard sensors, such as temperature indication and reservoir quantity indication.

The relationship between fluid temperature and reservoir level indication can provide for the estimation of mass of fluid of the entire system. This estimated value can be stored. By means of historical values of the current estimation, it is possible to obtain a value indicative of system fluid leakage.

An exemplary illustrative non-limiting implementation is also capable of determining and predicting future values of reservoir quantity or/and fluid mass of the entire system.

One exemplary illustrative non-limiting system works on a system architecture that can be applied to a number of prognostics and health monitoring solutions. The results from this solution can be presented (e.g., displayed) using an exemplary illustrative non-limiting user interface.

BRIEF DESCRIPTION OF THE DRAWINGS

These and other features and advantages will be better and more completely understood by referring to the following detailed description of exemplary non-limiting illustrative implementations in conjunction with the drawings of which.

DETAILED DESCRIPTION

Figure 1:
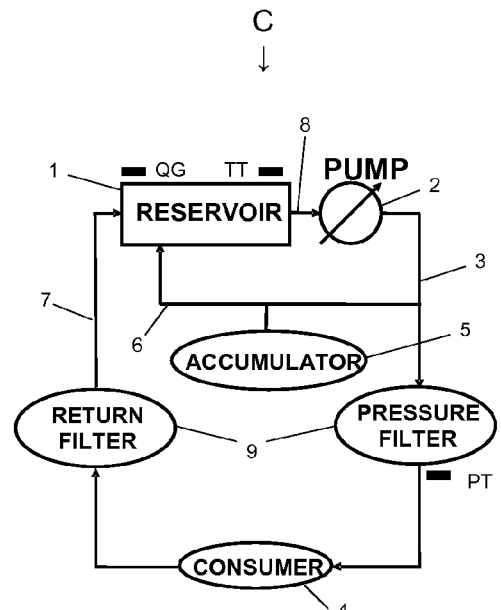
FIG. 1 is an exemplary illustrative non-limiting hydraulic system schematic with available sensors ("QG", "TT" and "PT")

The hydraulic circuit C shown in FIG. 1 may be mounted on board an aircraft or any other environment. Hydraulic circuit or system C comprises a pump 2 which is adapted to supply hydraulic fluid to a consumer 4 from a reservoir 1. The consumer 4 can be a hydraulic motor or a piston and can actuate any of a variety of different devices including brakes, flaps, landing gear, doors, or the like. The pump 2 pressurizes the fluid which in turn is used to operate or actuate consumer 4. In some systems there are a number of different consumers 4; in other systems each consumer has its own reservoir 1 and pump 2.

The reservoir 1 is pressurized by duct 6. The accumulator 5 supplies hydraulic fluid to the consumer 4 when the pump 2 is not operating or demand is too high from consumer 4. Pressure and return filters 9 are located at the discharge 3 and return 7 lines respectively. The reservoir 1 is connected to the suction duct 8 and return line 7 at a low pressure chamber and by duct 6 at a high pressure chamber which pressurizes the low pressure chamber by a piston.

Three sensors are available in the exemplary illustrative non-limiting FIG. 1 system:
- a pressure transducer ("PT") located at the pressure filter manifold;
- a quantity gauge ("QG") indicating fluid quantity at the low pressure chamber of the reservoir by measuring piston 1 position; and
- a temperature transducer ("TT") indicating fluid temperature at the low pressure chamber of the reservoir.

None of these transducers is capable of directly measuring fluid leakage. However, the exemplary illustrative non-limiting implementation uses outputs of these transducers to determine, estimate and indicate fluid leakage.

Figure 2:
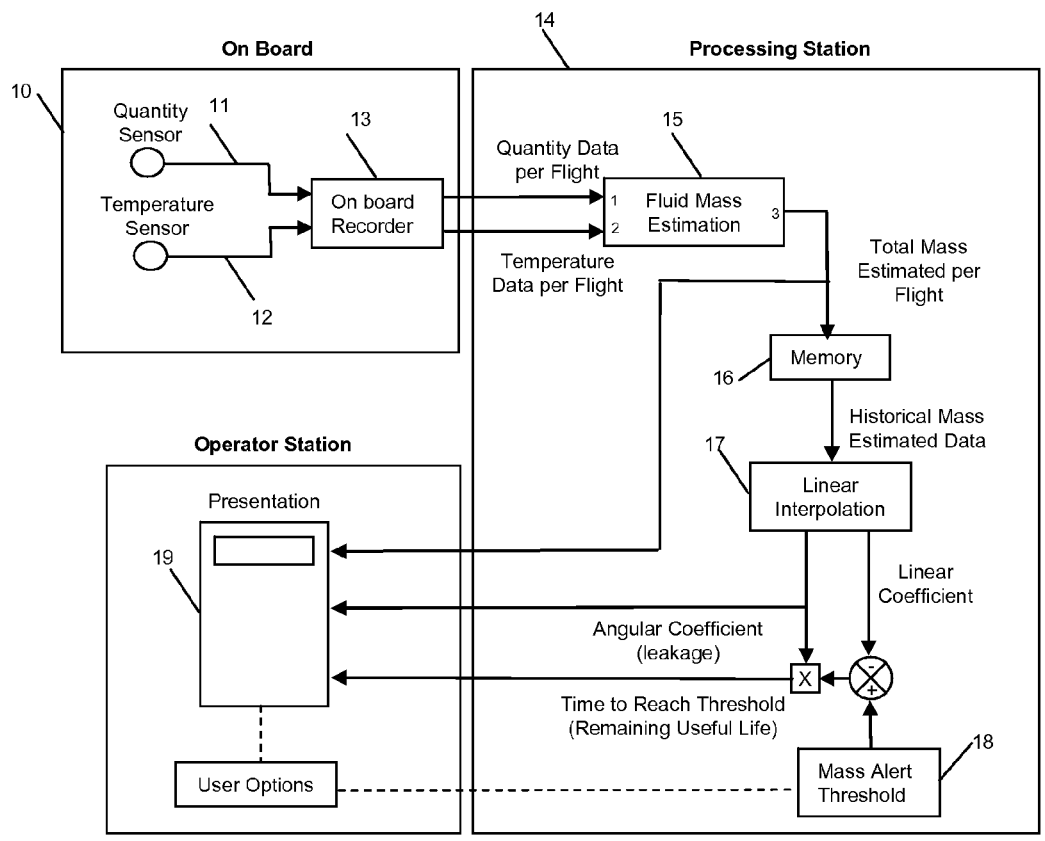
FIG. 2 is an exemplary illustrative non-limiting block diagram illustrating data flow from the sensors through results presentation.

The exemplary illustrative non-limiting system schematic shown in FIG. 2 comprises three main steps or sub-systems: the "onboard station" 10, the "processing station" 14 and the "operator station" 19. The onboard subsystem 10 is installed on board an aircraft or other installation, and includes the quantity sensor, temperature sensor and pressure sensor described above. In this particular exemplary illustrative non-limiting implementation, the onboard system 10 acquires data provided by the temperature transducer and quantity gauge sensor and stores them at an onboard recorder 13. Typically, the data recorded in the onboard recorder 13 is transmitted to a ground processing station 14 on the ground (in some applications, the processing station 14 can be co-located with the "on board" system 10).

In the exemplary illustrative non-limiting implementation, processing station 14 includes a fluid mass estimator 15. Current flight "total hydraulic system fluid mass" is estimated by current mass estimator 15 and stored in a memory 16. Using the last "total hydraulic system fluid mass" recorded at memory 16 and the historical values of same feature at same memory, a second order ("two degrees") polynomial curve fitting 17 provides two polynomial coefficients: the "linear coefficient" and the "angular coefficient". The angular coefficient represents the total mass decrease rate in time, in other words, leakage. The linear coefficient is combined with "angular coefficient" and a "mass alert threshold" 18. Mass alert threshold 18 can provide a low acceptable mass of hydraulic fluid that the system needs to operate properly with desirable acceptable safety margins. The result is the time that total mass will reach the threshold 18 defined, in other words, the "Remaining Useful Life". This information may be provided to operator station 19 for display or other visual, aural or tactile indication.

The curve fitting 17 in the exemplary illustrative non-limiting implementation uses the last "total hydraulic system fluid mass" recorded at memory 16 and the historical values of same feature stored in the same memory. For a suitable result, it is desirable to select the number of historical values used in the computation to provide optimal results. Using too many historical values could result in inefficiency and potential errors (since very old historical values may not be very relevant in some circumstances). On the other hand, using less than desirable numbers of historical values might generate imprecise results, so the exemplary illustrative non-limiting implementation uses a specific number of historical values in order to provide optimal algorithm performance to the user, e.g., the aircraft last 15 flights worth of recorded processed data.

Figure 3:
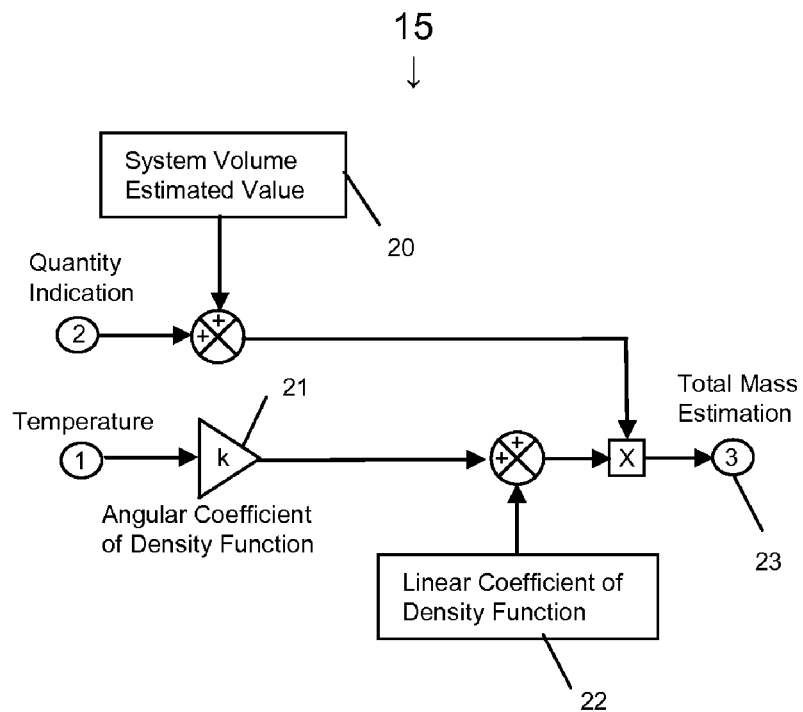
FIG. 3 is an exemplary illustrative non-limiting "Fluid Mass Estimation" algorithm based on a "Principal Component Analysis" method.

The processing arrangement shown in FIG. 3 illustrates in more detail the "Fluid Mass Estimation" block 15 of FIG. 2. The fluid temperature (1) from the temperature sensor is converted (using a linear or non-linear amplifier stage and adder stage for example) into density by applying the fluid density curve constants 21 and 22. Then, a multiplier multiplies these values by the total fluid volume which is a function of the quantity gauge sensor indication and the "system volume estimated value" 20. The result is total volume multiplied by density which is equal to the total mass estimation. The "system volume estimated value" 20 is the total fluid estimated volume not comprising the reservoir quantity indicated by the sensor. In most cases this indication is not known, so a data driven algorithm may be used to estimate it. This can comprise for example finding the value in the system volume estimated value 20 that minimizes the variance or standard deviation in the total mass estimation results 23 for a certain interval of input data without any great mass changes.

The "total hydraulic system fluid mass" estimated by 15 does not comprise "system volume estimated value" changes by actuators operation, accumulator volume changes, tubing thermal expansion, different fluid temperatures all over the system and other imprecision aspects. These imprecision aspects can be minimized by filtering the results and/or selecting particular operational intervals when is known they change less e.g., for aircraft during cruise.

Figure 4:
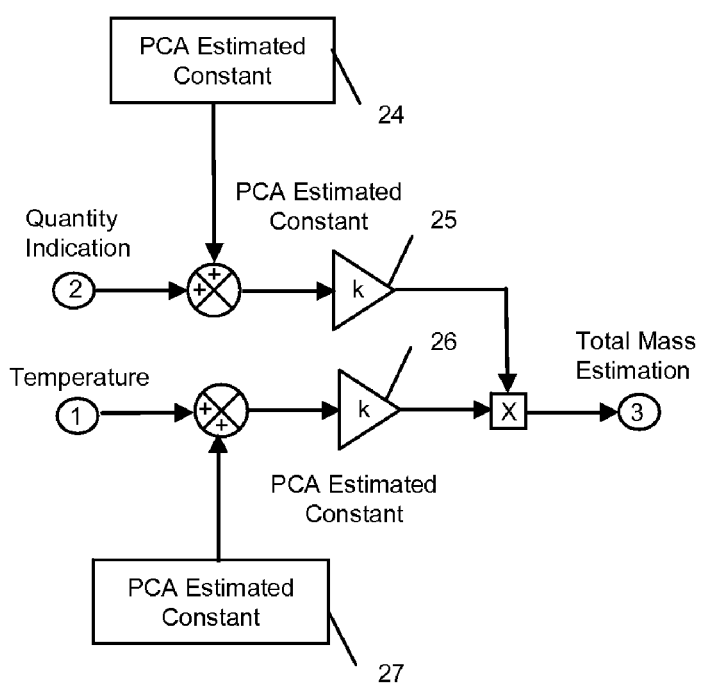
FIG. 4 is an exemplary illustrative non-limiting "Fluid Mass Estimation" algorithm based on density curve.

The processing arrangement shown in FIG. 4 describes an alternative for the FIG. 3 implementation. In this exemplary illustrative non-limiting implementation, the physics of the system were not considered, and a full data driven algorithm can be applied, e.g., the Principal Component Analysis (PCA). Principal Component Analysis is a technique for finding patterns of high dimension. See e.g., Smith, "A Tutorial in Principal Component Analysis" (2002). The constants 24, 25, 26 and 27 are the constants found by applying the PCA method for the same input data interval used in the previous method. The examples shown are non-limiting. Other empirical or analytical techniques can be used to develop the constants or other functions used to process the quantity indication and temperature indication to generate a total mass estimation.

Figure 5:
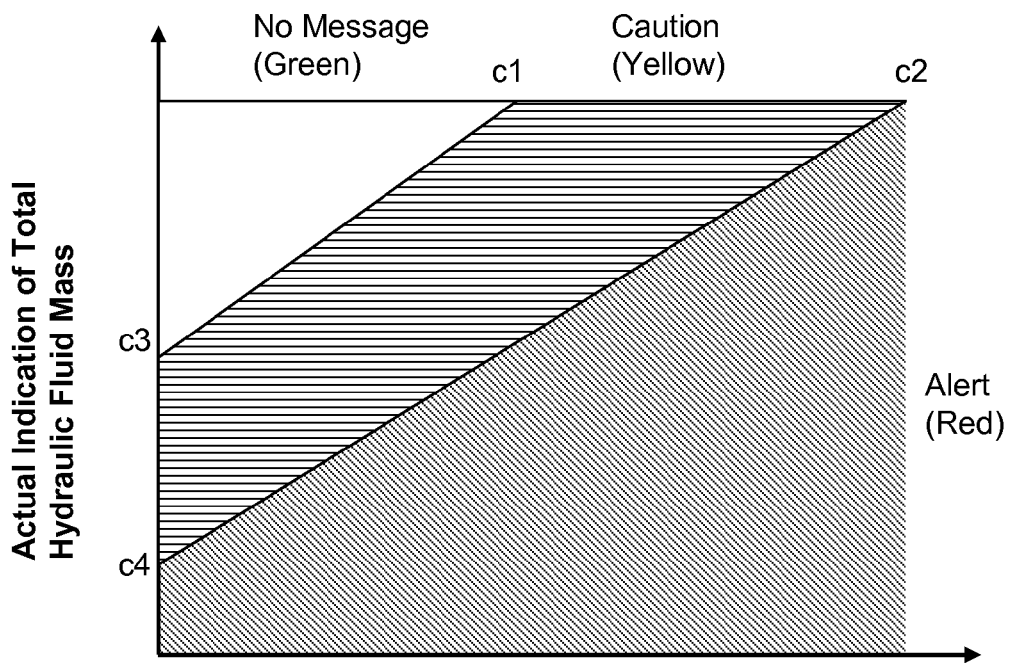
FIG. 5 is an exemplary illustrative non-limiting illustration of Alert intervals at the presentation block.
Figure 6:
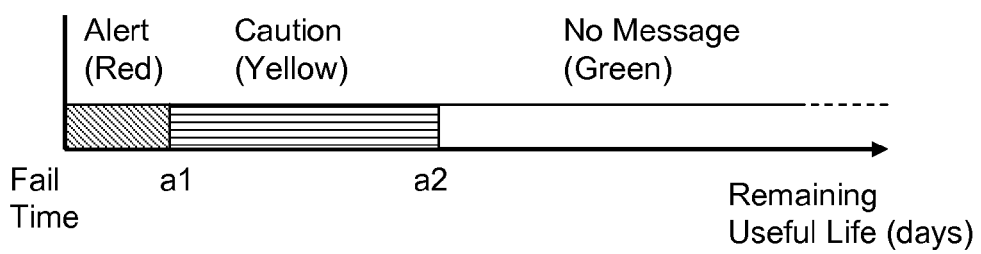
FIG. 6 is an exemplary illustrative non-limiting illustration of alternative Alert intervals at the presentation block based on Remaining Useful Life.

An alert system can provide the exemplary illustrative presentation 19 shown in FIG. 5. The graphic contains three main regions: Alert, Caution and No Message. These intervals can be presented by boxes with the following colors: Red, Yellow and Green for Alert, Caution and No Message respectively. Another way of presenting results is by text messages reports. Another solution of alerting regions is by means of the "Remaining Useful Life" as shown in FIG. 6. As the RUL decreases, the displayed (bar) region goes from "No Messages" to "Caution" and "Alert".

The constants "c1", "c2", "c3", "c4" from FIG. 5 and "a1", "a2" from FIG. 6 are the Parameters that define the alerting intervals. These numbers and the "Mass Alert Threshold" may be defined by a user interface to the operator. For example, an "Alerting Sensitivity Level" available at the presentation provides the following user defined input options: "High", "Medium" and "Low". The first one sets a1, a2, c1, c2 and Mass alert Threshold 18 with a lower value and c3 and c4 with a higher value. The last one sets a1, a2, c1, c2 and Mass alert Threshold 18 with a higher value and c3 and c4 with a lower value. The "Medium" define those parameters in an intermediate value.

Figure 7:
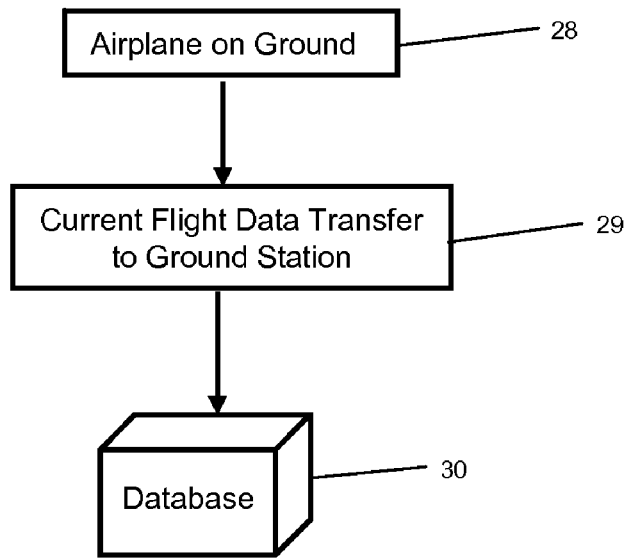
FIG. 7 is an exemplary illustrative non-limiting illustration of data transmission to ground database.

The processing arrangement shown in FIG. 7 describes an exemplary illustrative non-limiting process of getting the sensor data from the on board station 10 and its insertion at the database. First, the airplane arrives at the airport 28 and the sensor information is transferred to the processing station 14. These transferring processes 29 can be either manual or automatic. These data are inserted at a database 30 located at the on ground station. This process repeats at each aircraft landing.

Figure 8:
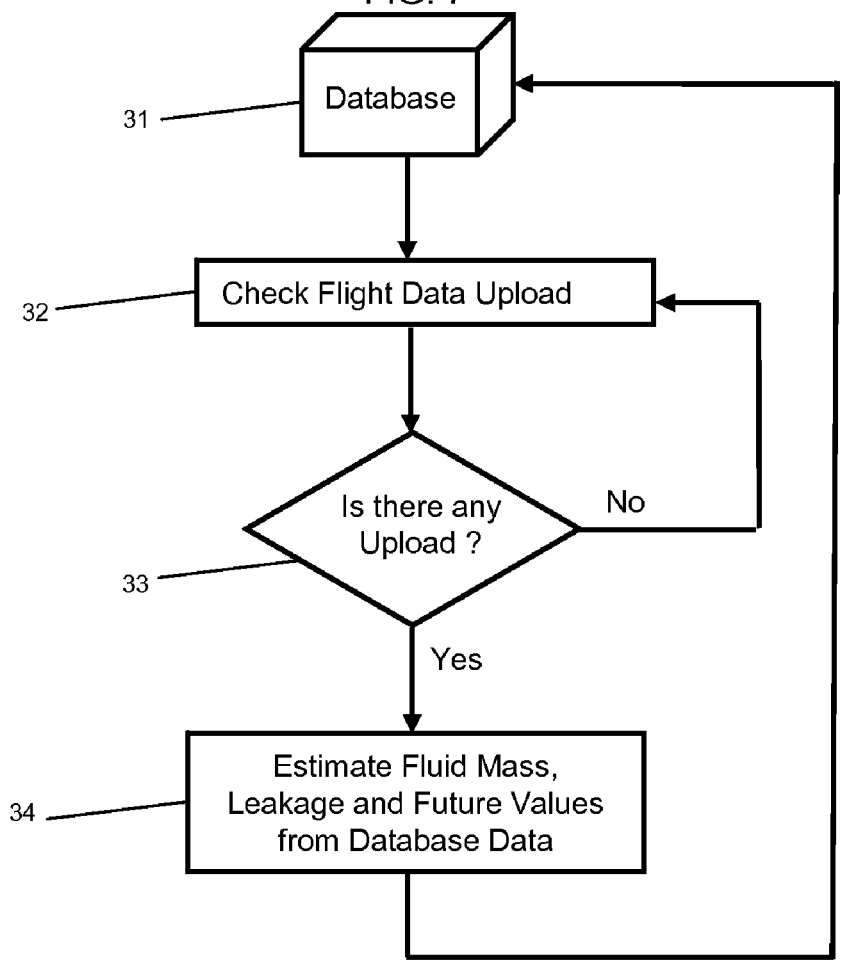
FIG. 8 is an exemplary illustrative non-limiting illustration of the automatic process of generating the results from the sensors data uploaded at the database.

The exemplary illustrative processing arrangement shown in FIG. 8 describes the process of manipulating the sensors data from the database 31 which is the same as 30 in FIG.6. This process can be independent of last one and is continuously running. The first step 32 is to check if any sensor data was inserted at the database. If not, the process enters a loop until any inserted data is found. When checking 33 detects any database upload, the process 34 estimates the "total hydraulic system fluid mass" from detected upload data, the current leakage and future values. These results are stored at the database 31 and process goes back to the data checking 32.

Figure 9:
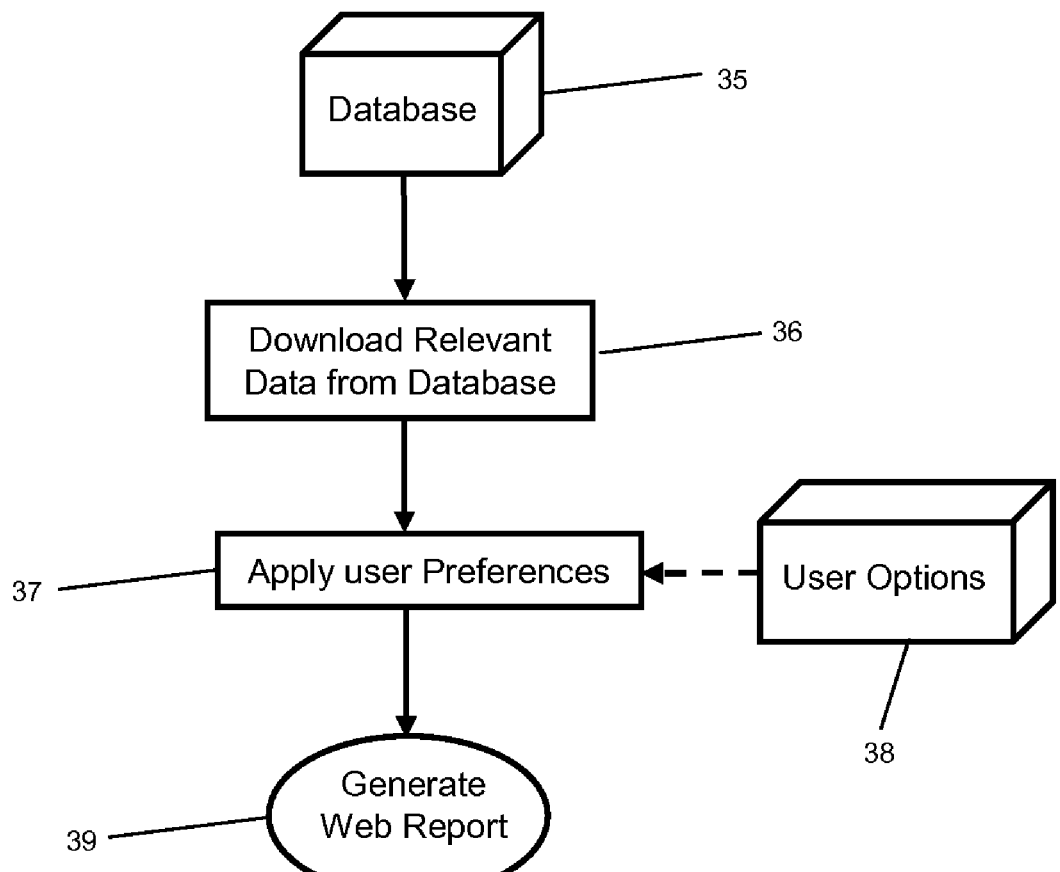
FIG. 9 is an exemplary illustrative non-limiting illustration of the presentation process.

The processing arrangement shown in FIG. 9 describes the process of presentation at the operator station. This process can be independent of the two last ones and runs only when the operator access the user interface 19. The first step 31 downloads the relevant data from the database 35 which is the same as databases 30 and 31. Then, the process determines the alerting results at the "apply user preferences" 37. These preferences use parameters provided from user options 36 which can be edited by the operator and stored at an Operator Station or at the Processing Station 14. These results are presented in a web report generated by 39 at a display or other visual, aural or tactile indication.

While the technology herein has been described in connection with exemplary illustrative non-limiting implementations, the invention is not to be limited by the disclosure. The invention is intended to be defined by the claims and to cover all corresponding and equivalent arrangements whether or not specifically disclosed herein.

I claim:

1. A method of detecting and predicting hydraulic fluid external leakage from an aircraft hydraulic system of the type including a device that pressurizes fluid from or in a fluid reservoir and at least one hydraulic line that delivers said pressurized fluid to at least one pressure consumer onboard an aircraft, said method comprising:
   using at least one sensor to sense at least reservoir fluid quantity and fluid temperature within said hydraulic system;
   determining, at least in part in response to said reservoir sensed quantity and temperature, an estimated value indicative of the entire hydraulic system total fluid mass;
   combining said estimated value with at least some historical sensed parameter values to provide a prediction for the future value of total fluid mass; and
   displaying on a human-machine interface an indication at least in part associated with total system leakage of hydraulic fluid from the aircraft hydraulic system.

2. The method of claim 1 further including providing an alert based on comparison between sensed parameter future predicted values and a threshold.

3. The method of claim 1 wherein said combining includes fluid mass curve fitting.

4. The method of claim 1 wherein said combining includes second order polynomial fluid mass curve fitting.

5. The method of claim 1 wherein said display provides a graphical user interface that graphically represents estimated total system leakage of said hydraulic fluid, expected time to indication of total hydraulic fluid mass reaches a defined threshold and uses different colors to indicate alert state.

6. The method of claim 1 wherein said displaying includes providing a two-dimensional graphical display that plots historical indication of total hydraulic fluid mass against time.

7. The method of claim 1 wherein said determining includes estimating fluid density from fluid temperature sensor indication and multiplying by the sum of quantity gauge sensor indication and system volume estimated value.

8. The method of claim 1 wherein said determining includes applying a PCA estimated constant.

9. An aircraft hydraulic system comprising:
   a fluid reservoir;
   a device that pressurizes fluid from or in said reservoir;
   at least one hydraulic line that delivers said pressurized fluid supplied by said fluid reservoir to at least one pressure consumer onboard an aircraft;
   at least one sensor that senses at least reservoir fluid quantity and fluid temperature associated with said pressurized fluid and/or said reservoir;
   an estimator that determines, at least in part in response to said sensed quantity and temperature, an estimated value indicative of the entire hydraulic system total fluid mass;
   a combiner that combines said estimated value with sensed historical parameter values to provide a prediction for the future value of total fluid mass; and
   a display that displays on a human-machine interface an indication at least in part associated with total system leakage of hydraulic fluid from the aircraft hydraulic system.

10. The system of claim 9 wherein said estimator includes means for generating a PCA estimated constant.

11. The system of claim 9 wherein said estimator includes means for generating a system volume estimated value.

12. The system of claim 9 wherein said combiner includes a fluid mass curve fitting.

13. The system of claim 9 wherein said display provides a graphical user interface that graphically represents estimated total system leakage of said hydraulic fluid and uses different colors to indicate alert state.

14. A method of detecting and predicting hydraulic fluid external leakage from an aircraft hydraulic system of the type including a device that pressurizes fluid from or in a reservoir and at least one hydraulic line that delivers said pressurized fluid to at least one onboard pressure consumer, said method comprising:
   during a current flight, sensing at least one of reservoir fluid quantity and fluid temperature associated with the aircraft hydraulic system;
   determining, at least in part in response to said sensed at least one of reservoir fluid quantity and fluid temperature, an estimated value indicative of the entire hydraulic system fluid mass;
   combining said estimated value with at least some historical sensed parameter values from previous flights to provide a prediction for the future value of total fluid mass; and
   displaying on a human-machine interface an alert if said prediction indicates that sufficient leakage will occur to cause hydraulic fluid mass within the aircraft hydraulic system to fall below a predetermined level.

* * * * *